US008333811B2

(12) United States Patent
Hatziemmanouil

(10) Patent No.: US 8,333,811 B2
(45) Date of Patent: Dec. 18, 2012

(54) METHOD FOR REFINING VEGETABLE OILS AND ADDITIVE THEREFORE, AND THEIR USE AS SUBSTITUTE OF DIESEL FUEL

(75) Inventor: Efstratios Hatziemmanouil, Thessaloniki (GR)

(73) Assignee: Aristotle University of Thessaloniki Research Committee, Thessaloniki (GR)

( * ) Notice: Subject to any disclaimer, the term of this patent is extended or adjusted under 35 U.S.C. 154(b) by 708 days.

(21) Appl. No.: 12/309,582

(22) PCT Filed: Jul. 18, 2007

(86) PCT No.: PCT/GR2007/000037
§ 371 (c)(1),
(2), (4) Date: Jan. 21, 2009

(87) PCT Pub. No.: WO2008/009999
PCT Pub. Date: Jan. 24, 2008

(65) Prior Publication Data
US 2009/0313887 A1    Dec. 24, 2009

(30) Foreign Application Priority Data
Jul. 18, 2006    (GR) .............................. 20060100421

(51) Int. Cl.
*C10L 1/00*   (2006.01)
*C11B 3/02*   (2006.01)
(52) U.S. Cl. .......................................... 44/307; 554/208
(58) Field of Classification Search .................... 44/307; 554/208
See application file for complete search history.

(56) References Cited

U.S. PATENT DOCUMENTS

| | | | |
|---|---|---|---|
| 2,337,041 A | | 12/1943 | Cornell et al. |
| 3,025,314 A | | 3/1962 | King et al. |
| 3,362,794 A | | 1/1968 | Bergman |
| 5,688,295 A | | 11/1997 | Yang |
| 6,033,706 A | * | 3/2000 | Silkeberg et al. ............. 426/417 |
| 2005/0132642 A1 | | 6/2005 | Gibson |
| 2007/0119095 A1 | * | 5/2007 | Wetzel ............................ 44/308 |
| 2007/0124992 A1 | * | 6/2007 | Reaney et al. .................. 44/389 |

FOREIGN PATENT DOCUMENTS

| | | |
|---|---|---|
| EP | 0478090 | 4/1992 |
| EP | 0936266 | 8/1999 |
| JP | 2002/226875 | 8/2002 |
| WO | WO 01/18155 | 3/2001 |

OTHER PUBLICATIONS

O'Brien, R., Jones, L.A., King, C.C., Wakelyn, P.J., Wan, P.J., in Bailey's Industrial Oil and Fat products, 6th ed., vol. 2, Shahidi, F. Ed., John Wiley & Sons, 2005, pp. 214-235.*
Mahmoud et al.; *Studies on some factors and treatments affecting the stability of cottonseed oils*; Agricultural Research Review, Sep. 1977; pp. 153-166 XP-008084638.
Wagialla et al.; *A Comparative Study of Batch and Continuous Refining of Cottonseed Oil in the Sudan*; JAOCS, vol. 61, No. 5; May 1984; pp. 900-907.
Hendrix, W.B.; *Current Practices in Continyuous Cottonseed Miscella Refining*; JAOCS, vol. 61, No. 8; Aug. 1984; pp. 1369-1372.
Altin et al.; *The potential of using vegetable oil fuels as fuel for diesel engines*; Energy Conversion & Management; vol. 42; 2001; pp. 529-538.
Yemisoglu et al.; *The usage of acid activated bleaching earth and sysnthetice silka in the bleaching of oils*; FSTA/IFIS (Abstract) (2004) XP-002454300.
Mohd et al.; *Performance and emission characteristics of a diesel engine with cottonseed oil plus diesel oil blends*; International Journal of Engineering; vol. 18, No. 1; Feb. 2005; pp. 1-7 XP008084526.
Kuk et al.; *Gossypol Removal by Adsorption from Cottonseed Miscella*; JAOCS, vol. 82, No. 12; (2005) pp. 905-909 XP-00245297.
Rakopoulos et al.; *Comparative performance and emissions study of a direct injection diesel engine using blends of diesel fuel with vegetable oils or bio-diesels of various origins*; Energy Conversion & Management, vol. 47, (2006) pp. 3272-3287 XP-002454299.
Rakopoulos et al.; *Characteristics of the performance and emissions of a HSDI diesel engine running with cottonseed oil or its methyl ester and their blends with diesel oil*; International Journal of Vehicle Design, vol. 45, No. ½ (2007) pp. 200-221 XP-001536809.

* cited by examiner

*Primary Examiner* — Jim Goloboy
(74) *Attorney, Agent, or Firm* — James Creighton Wray

(57) ABSTRACT

This invention relates to a method for refining vegetable oils, in particular cottonseed oil or a possible mixture of it with others, as substitute of diesel fuel remarkable in that a sequence of treatment steps to be performed on crude vegetable oil, including: a) a pre-treatment thereof consisting of the removal of oil insoluble impurities from the crude oil, b) removal of oil soluble impurities therefrom, c) a free acid neutralization thereof, and d) a drying, bleaching and filtration thereof. This invention also relates to an Additive of organic basis, containing ether, ketone, toluene, hexane, turpentine, alcohols in specific concentrations.

19 Claims, 7 Drawing Sheets

Driving Cycles of the Measurement Protocol

Figure 1:
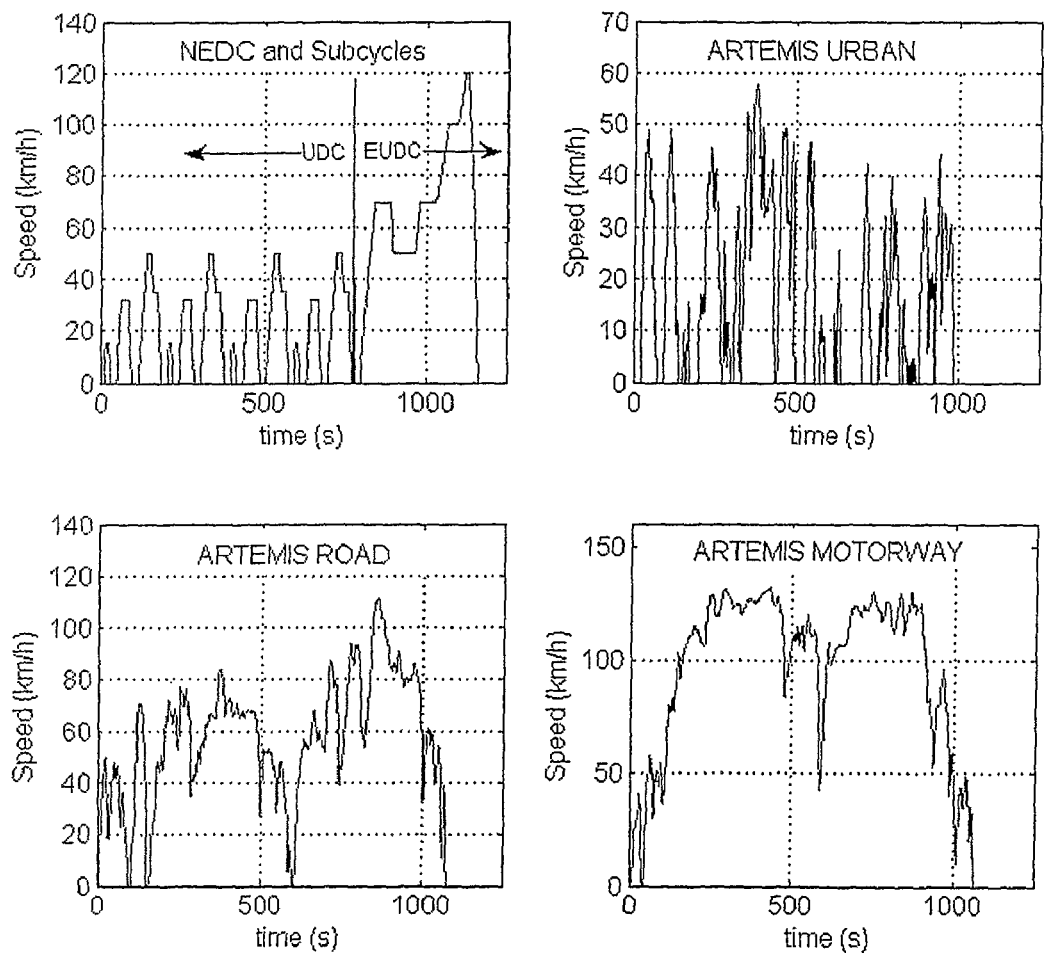

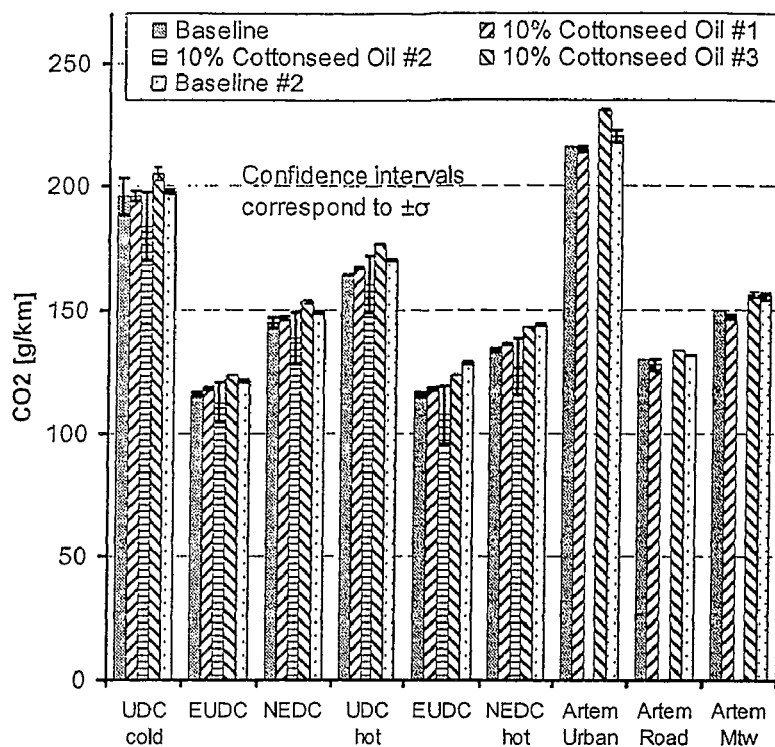
Figure 2 $CO_2$ Measurements results
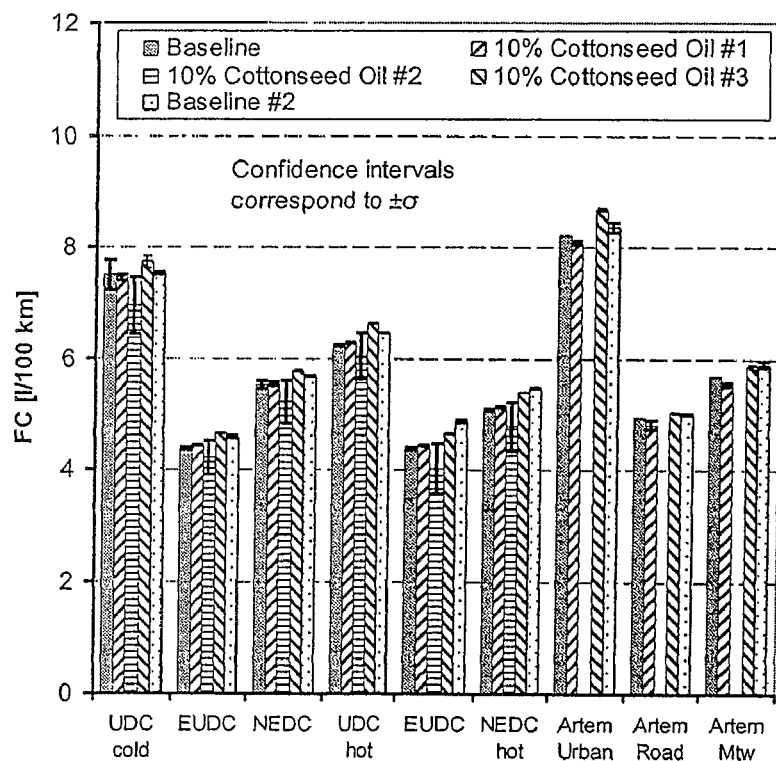
Figure 3 Fuel consumption measurements results

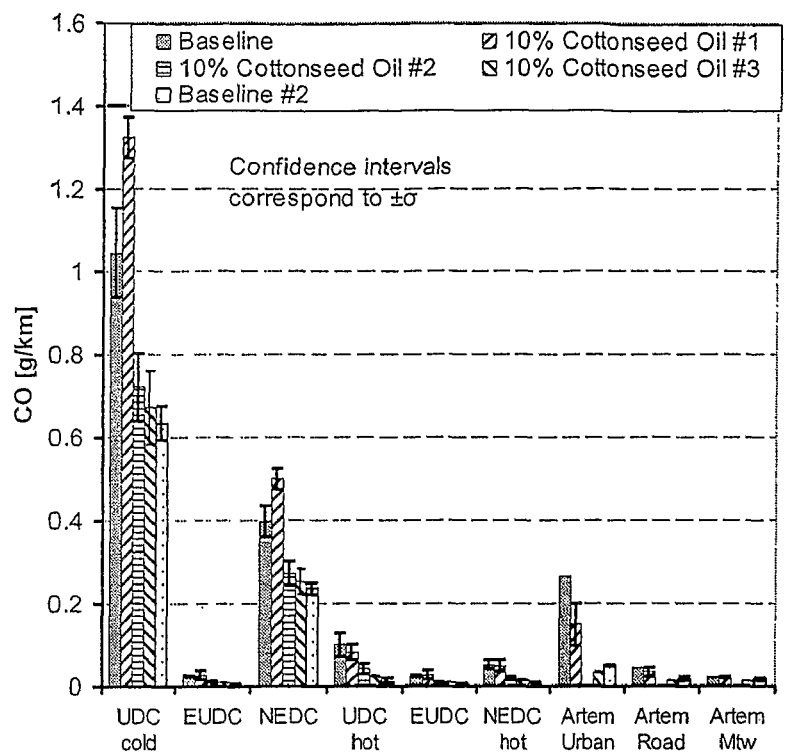
Figure 4 CO Emissions measurements results
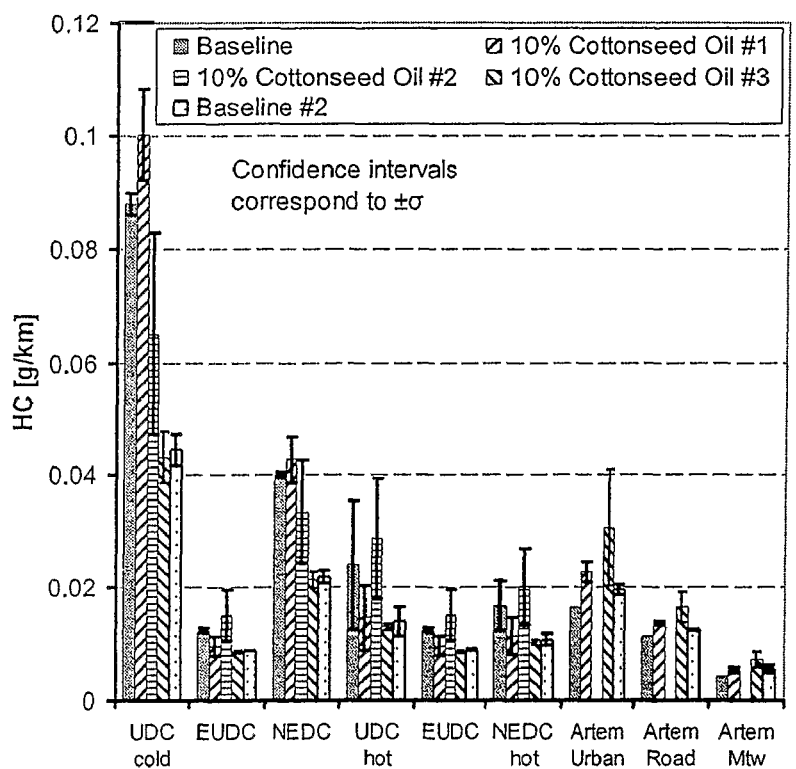
Figure 5 HC emissions measurements results

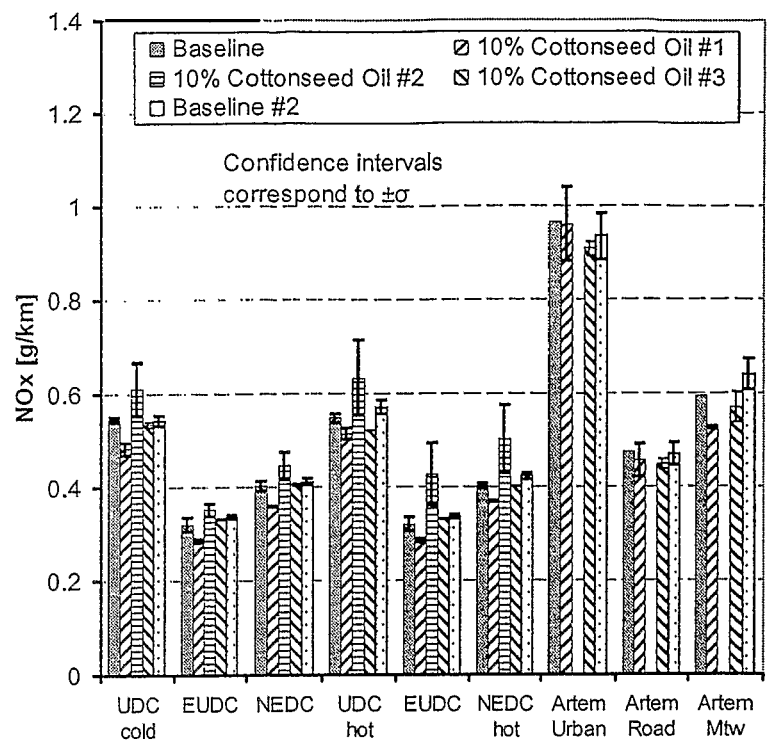
Figure 6 NOx emissions measurements results
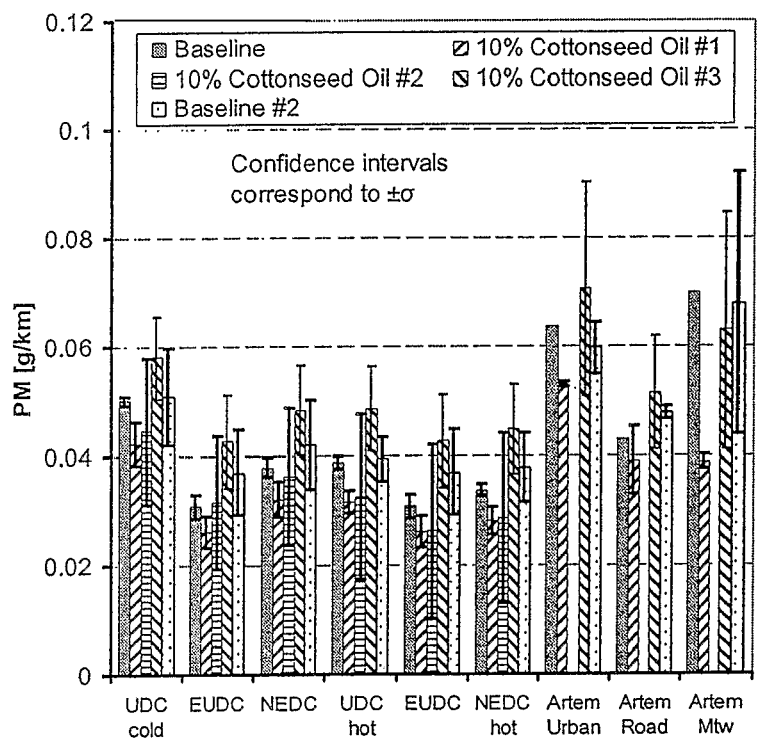
Figure 7 PM emissions measurements results Schematic of the setup employed for the measurement of the unregulated particle properties Total particle number emission rate for the different car setups. The dots correspond to average values while the error-bars depict the maximum – minimum obtained

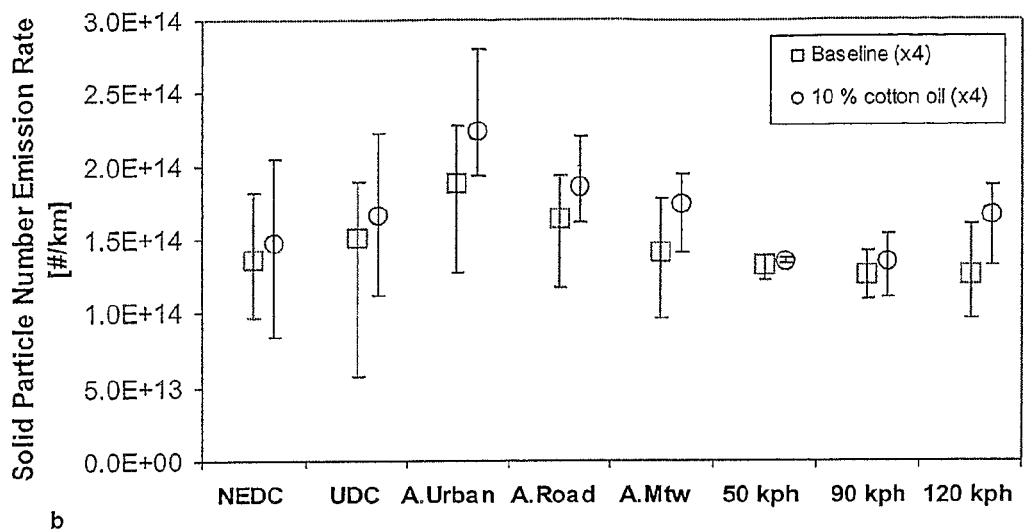
Figure 9b Solid particle number emission rate for the different car setups. The dots correspond to average values while the error- bars depict the maximum – minimum obtained
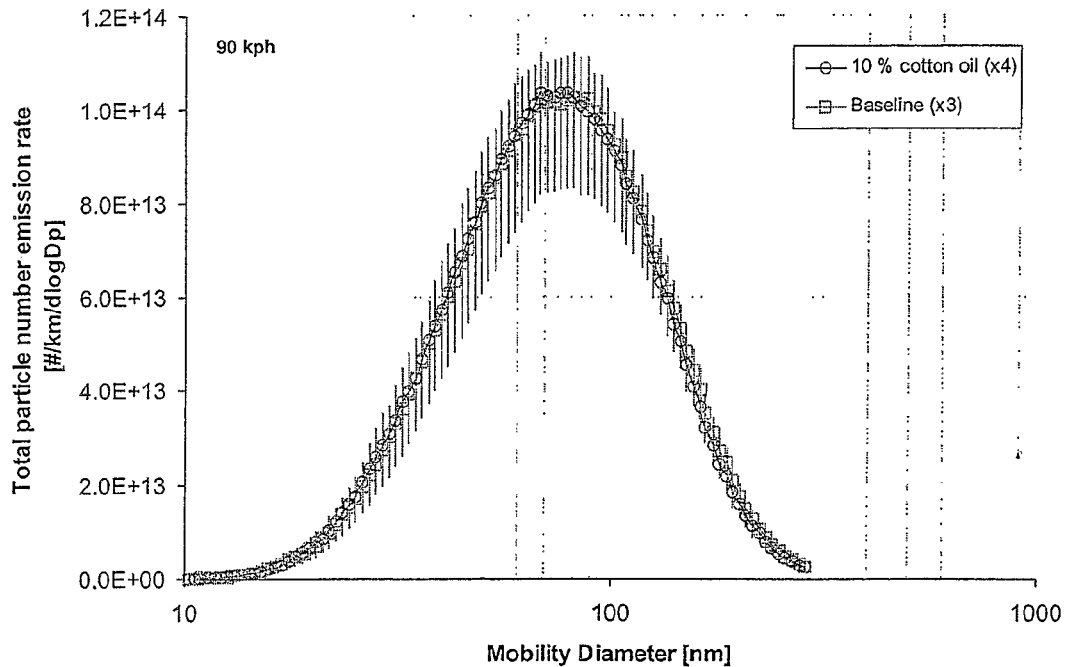
Figure 10 Number weighted size distributions at 90 kph steady speed cruising. The error bars enclose the minimum – maximum concentrations measured over different test repetitions

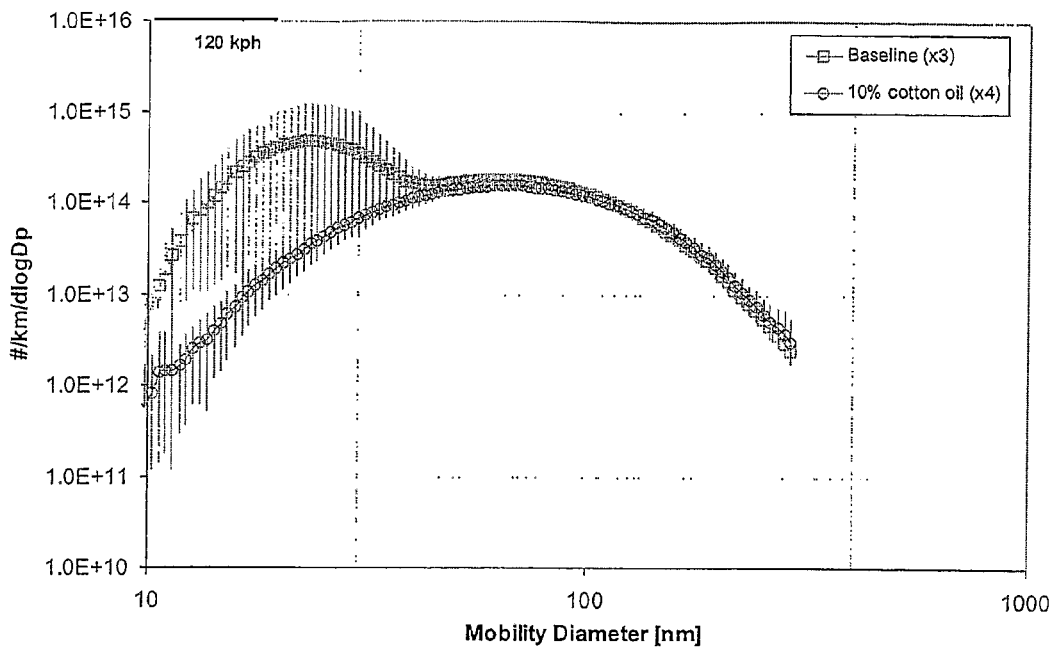
Figure 11 Number weighted size distributions at 120 kph steady speed cruising. The error bars enclose the minimum – maximum concentrations measured over different test repetitions
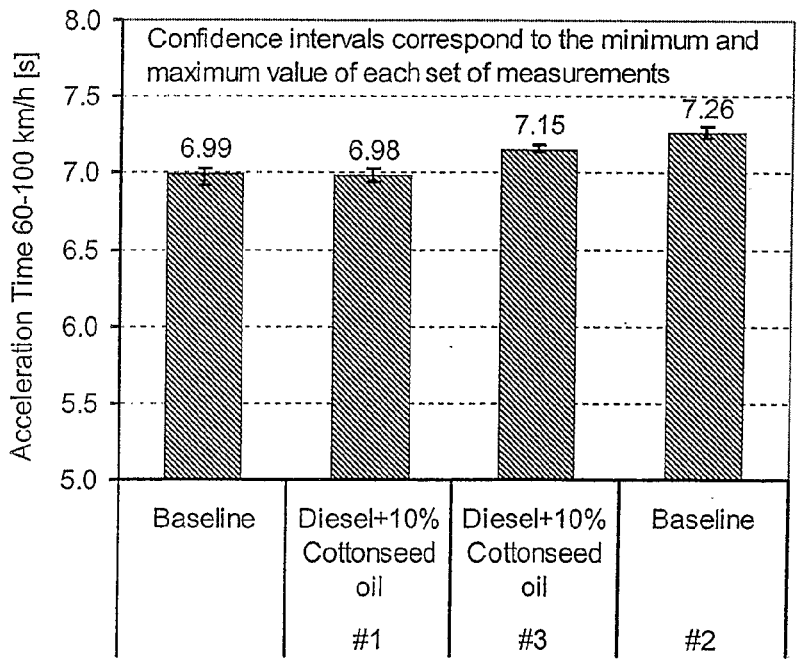
Figure 12 Acceleration test results

METHOD FOR REFINING VEGETABLE OILS AND ADDITIVE THEREFORE, AND THEIR USE AS SUBSTITUTE OF DIESEL FUEL

This application claims the benefit of Greek Application No. 20060100421 filed Jul. 18, 2006 and PCT/GR2007/000037 filed Jul. 18, 2007, which are hereby incorporated by reference in their entirety.

FIELD OF THE INVENTION

This invention relates to a method of refining a vegetable oil, mainly cottonseed oil, in order to be used as suitable substitute of diesel fuel at least partially.

BACKGROUND OF THE INVENTION

The environmental and economical problems related with diesel fuel are well known, and efforts to substitute a percentage of it with biofuels are underway (European Directive 30/2003 about the necessity of using biofuels as substitutes for diesel fuel).

A generally accepted substitute of diesel fuel is a mixture of methyl esters of fatty acids, produced from the chemical treatment of lipids and mainly vegetable oils. This mixture of methyl esters is called "Biodiesel" defining and confining the general meaning of this term. The European standard EN14214/2003 which defines the technical requirements of Biodiesel refers exclusively to fatty acids methyl esters and to no other possible substitute.

The European Directive 30/2003 defines that vegetable oils that are compatible with diesel engines, and their exhausts are compliant with the requirements of legislation are considered as Biofuels. So far, no one proved indisputably that vegetable oils have the ability to offer high quality biofuels, complying with the technical requirements of the European standards EN14214/2003 for Biodiesel and EN 590/1999 for Diesel fuel. Therefore the question arises what the impediment was of a scientific thorough research of this subject.

The answer mainly lies in the Cetane Number which is a measure of the flammability and quality of diesel fuel, as the octane number is a figure of merit for gasoline burned in spark ignition engines.

It is well known that:
1. Current European Diesel fuel has a Cetane Number of about 52.
2. Vegetable oils have Cetane Number in the range of 40.
3. The lower acceptable limit of Cetane Number for Biodiesel is 51.

So the experts concluded that vegetable oils are not the proper substitutes for diesel fuel since they will devaluate its quality. Consequently vegetable oils should be chemically transformed to Fatty Acids Methyl Esters acquiring characteristics of an acceptable fuel, regardless of the product cost.

Other factors that prevented the use of vegetable oils as biofuels, were considered the possible problems with engine cold start and filter plugging which might occur at temperatures below 0° C. These problems are improved with the transformation of the oils to methyl esters without being eliminated completely.

All the above were some of the reasons for exception of vegetable oils to be used as substitutes of diesel fuels, leading to the unique solution of the Fatty Acid Methyl Esters, despite the fact of their serious disadvantages. Since the European Directive 30/2003 promulgated the compulsory use of FAME, these disadvantages are either understated or silenced, but they do exist and are mainly the following:

In the mixture of Biodiesel, which is produced from the esterification of fatty acids with methanol, there is a quantity of fatty acids, an inevitable result of the reversible nature of the chemical reaction. The existence of these acids can not be eliminated by using excess of methanol and repeating the procedure several times, due to cost constraints and to the fact that the final price should be close to the price of diesel fuel.

There are reservations of automotive manufacturers about metal wear in the engines when Biodiesel is used being mixed with diesel fuel, because of the existence of these acids. During the first step of the chemical process for Biodiesel production (hydrolysis) glycerin is produced as byproduct at 10 to 11 percent by volume of Biodiesel. This glycerin has to be sold in the market and used. Currently the market is saturated due to overproduction from the continuously built factories of Biodiesel. Hence the price of Biodiesel is very close to the price of diesel fuel and not attractive to consumers.

PRIOR ART

The production of Biodiesel is conducted with the treatment of a lipid, usually a vegetable oil, with caustic soda (NaOH) for hydrolysis towards fatty acids and glycerin. At a second step the fatty acids are esterified with excess of methanol ($CH_3OH$). The chemical reactions are reversible and the analytical mechanism is the following:

1st Stage: Lipid Hydrolysis

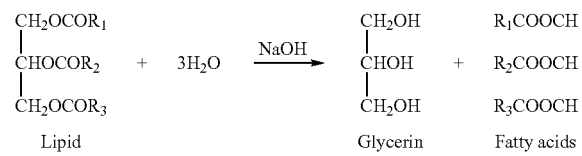

2nd Stage: Fatty Acids Esterification (Reversible Reaction):

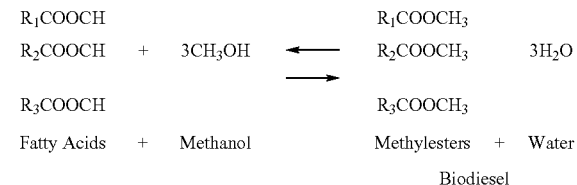

Attention has to be paid at the second stage of esterification wherein the reaction is reversible. Even though an excess of methanol is used, dehydration and repeating the procedure a second and even a third time, the existence of these acids cannot be eliminated and the yield of the reaction cannot be 100%.

At the end of this industrial well-known procedure, washing the product of methylesters with acidified water ($H_2SO_4$) is necessary to clear the product and remove the natrium hydroxide NaOH and resulting a new hydrolysis of them to fatty acids. Repeating the reaction many times increases the cost and affects the price of the product/diesel.

The firms that sell and install new Biodiesel production facilities avoid to use the term fatty acids and do not present the full chemical reaction scheme. Instead, they present a inter-esterification, not mentioning the intermediate formation of organic acids:

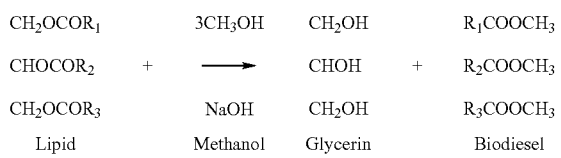

AIM OF THE INVENTION

The object of this invention is to avoid the above-mentioned disadvantages. For this reason the use of a vegetable oil is proposed, specifically the cottonseed oil, as substitute of diesel fuel, providing a defined production method for refining this vegetable oil in order to become compliant for this purpose avoiding the above-mentioned disadvantages of methyesters, while at the same time the disadvantages of vegetable oils are advantageously avoided in a remarkable thereby way, offering a product which is safer for engines and in a better price for this kind of engines.

SUMMARY OF THE INVENTION

There is thus proposed according to the present invention, a method as defined in claim 1. Thus, the procedure of refining the vegetable oil and specifically the cottonseed oil is remarkable by a series of stages of treatment of the crude oil including:
 a) Removal of insoluble impurities from the vegetable oil
 b) Removal of oil soluble impurities (particles/substances)
 c) Neutralization of the free acids from the oil, or de-acidification
 d) Drying, bleaching and filtration.

According to a supplementary embodiment of the invention, after the preceding stages follows a stage of elimination of stearins of this oil (de-stearinization by filtration).

According to another supplementary embodiment of the invention, after the preceding stages follows a stage of deodorization-stabilization of this oil.

According to one particularly preferential embodiment of the invention, the said de-stearinization step is performed by successively

| | |
|---|---|
| a) Pre-cooling the oil at T1 with agitation | during t1 |
| b) Cooling and crystallization at T2 without agitation | during t2 |
| c) Cooling and crystallization at T3 without agitation | during t3 |
| d) Filtration | during t4 | where T1, T2, T3 are the temperatures and t1, t2, t3, t4 the time intervals for the intermediate stages, which may vary according to the season and the low temperatures of a given region, resulting in the cotton seed oil achieved with this procedure and the addition of the proper additive does not affect the CFPP value of Diesel fuel.

According to another embodiment of the invention in the above step removal of components is achieved that may belong to either of the following groups:
 Substances which are present in the crude oil and are responsible for the characteristic odor, such as unsaturated hydrocarbons, carotenoid pigments, terpenes etc. and/or
 Substances arising from deterioration of oil quality during storage or processing, such as hydrocarbons, free fatty acids resulting from glyceride hydrolysis, ketones and aldehydes as products of fatty acids degradation and peroxides produced during oil storage, possibly from oxidized molecules break-down and enzymatic activities.

The invention also provide an additive to improve the characteristics of << cold flow >> in mixtures of diesel fuel with vegetable oil, especially cottonseed oil.

According to another specific embodiment of the invention, an additive is proposed. The ingredients of the additive composition are advantageously: ether, ketone, toluene, hexane, turpentine oil, alcohols in certain percentages, and more specifically diethylether or another ether of low molecular weight, acetone or another low molecular weight as methylethyl ketone, toluene, hexane or another low molecular weight saturated hydrocarbon, turpentine, methyl alcohol or another low molecular alcohol and ethyl alcohol or another low molecular weight alcohol as isopropyl alcohol.

According to another advantageous embodiment of the above feature of the invention, the permissible amount of diethylether $CH_3CH_2OCH_2CH_3$ or another ether of low molecular weight is about 1-2%, the amount of Acetone $CH_3COCH$ or another low molecular weight ketone is 15-25%, wherein the percentage of toluene $CH_3C_5H_6$ is 5-15%, the percentage of hexane $C_6H_{14}$ or another low molecular weight saturated hydrocarbon is 15-25%, the amount of turpentine oil is 15-25%, the amount of methy alcohol $CH_3OH$ or another low molecular weight alcohol is 15-25% and the amount of ethyl alcohol $CH_3CH_2OH$ or another low molecular weight alcohol is 5-10%.

According to one particular preferential embodiment of the invention, the refined oil is produced according to the method as defined in the claims 1 to 31, with the addition of an additive as defined in the claims 32 to 35.

More particularly, to the above mentioned refined oil is provided a mixture of the said additive at a percentage 400-800 per million in mixture of 10% of the refined cottonseed oil in diesel fuel.

According to a specific feature of the invention, the use of a refined oil as produced according to the method of claims 1 to 31, is provided as substitute of diesel fuel partially.

According to a particularly preferred embodiment of the invention, the use of the above mentioned refined oil according to the claims 35-36 is provided as a substitute of diesel fuel partially.

DETAILED DESCRIPTION OF THE INVENTION

According to its basic particular feature, this invention relates to a method of refining a vegetable oil, particularly a cottonseed oil, as described hereafter according to one principal exemplary embodiment. The following stages are described hereunder in more details substantially advantageous for the "refining" of said oil. The following steps are essential in the refining process.

A combination of settling and filtration or centrifugation of the crude oil is an adequate sufficient pre-treatment for removing the solid insoluble impurities of it. This stage is the basis for the correct refining.

After removal of the insoluble impurities, the said oil still contains free fatty acids and a number of substances foreign to the glycerides of pure oil. These impurities may be proteins, gums, resins, photosphatides, coloring matters, hydrocarbons, ketones, aldehydes and peroxide compounds in true solution or in state of colloidal suspension. All these substances must be eliminated, as this mucilage would cause plugging of fuel filter and produce residues in the engine. The most effective method of cleaning these undesirable impurities is to combine this stage with neutralization of the free fatty acids with caustic soda, since with the soap formed by the neutralization of the free fatty acids a large proportion of the impurities is removed. Compared to other processes, this method of combined neutralization and cleaning is preferable also for cost reasons.

The methods vary in details. In the present case the addition of a strong caustic soda solution, of 20° Be, in 60-80 percent excess is required for neutralization. It not only neutralizes the oil, but also purifies it to a large extent, while simultaneously a partial bleaching (decolorization) is achieved, thereby facilitating the subsequent main bleaching. In order to produce sufficiently purified oil, the excess of caustic soda is essential. Thus, however, an over saponification takes place and a loss of some neutral oil cannot be avoided. After removing the created soap by settling or centrifugation, an addition of weak caustic soda, 6-8° Be, is required to clear out the particles of suspended soap and remove the remaining coloring matters. At the end, repeated hot water washing of the oil at about 98° C. is necessary, to eliminate the traces of caustic soda, soap and different particles. This treatment should reduce the acidity in the oil to less than 0.05%.

After neutralization the oil requires drying to remove moisture, which might also induce hydrolysis of glycerides. In order to avoid this, drying should be done at elevated temperature (about 90° C.) in closed vessels and under vacuum of 30 mmHg. Then under vacuum, bleaching earth is mixed with the oil and after about 30 minutes the oil is filtered to remove particles and coloring matters. Bleaching can induce an important increase in the stability of the oil. This method of decoloration by adsorption is very important, since material with high active surface, such as bleaching earths and active carbon, retain the coloring substances by adsorption. These adsorbents have the capacity to adsorb on their surface not only the coloring components but also other colloidally suspended substances such as gums, resins and certain degradation products, which might affect correct fuel combustion.

De-stearinization by filtration: This procedure is very important in order to achieve the necessary CFPP (Cold Filter Plugging Point) of the cottonseed oil and its mixtures with Diesel fuel. Certain constituents of the oil, which are soluble at medium and higher temperatures, crystallize and make the oil turbid and cloudy in cold weather and temperatures below 3° C. This may affect the viscosity and flow properties of cottonseed oil and its mixtures with Diesel fuel. The process of removing these constituents from the oil consists in cooling the oil for a prolonged period of time at temperatures some degrees below that at which the oil is required to remain clear and subsequently filtering it. Cooling must be sufficiently slow to enable components with higher melting point to form well built crystals. Small crystals which result from too rapid cooling may render filtration difficult.

Cooling and filtration are carried out in a well insulated room equipped with refrigeration. An example of this process is given below, although the temperatures and the time periods for the intermediate stages may vary according to the season and the low temperatures of a certain region.

| | | |
|---|---|---|
| a) Pre-cooling the oil at 5° C. with agitation | 5 hours |
| b) Cooling and crystallization at 0° C. without agitation | 12 hours |
| c) Cooling and crystallization at −7° C. without agitation | 24 hours |
| d) Filtration | 8 hours |

The cotton seed oil after this procedure and the addition of the proper additives does not affect the CFPP value of Diesel fuel.

Deodorization is then carried out. This process is performed for removing undesirable substances of the oil by passing a current of dry steam through the oil at temperatures of the order of 200-225° C., under vacuum 6-30 mmHg. The so removed components may belong to two groups:

Substances which are present in the crude oil and are responsible for the characteristic odor, such as unsaturated hydrocarbons, carotenoid pigments, terpenes etc.

Substances arising from deterioration of oil quality during storage or processing, such as hydrocarbons, free fatty acids resulting from glyceride hydrolysis, ketones and aldehydes as products of fatty acids degradation and peroxides produced during oil storage, possibly from oxidized molecules break-down and enzymatic activities.

Said process of deodorization aims at removing the undesirable odoriferous compounds and substances, such as peroxides and broken-down molecules, yielding finally a very stable product.

At the end of this process and thanks to the addition of proper additives, and more particularly of the additive according to the invention described below, cottonseed oil appears to be a very successful substitute for the Diesel fuel.

With regard to an additional specific feature of the present invention, an additive is provided as specified more in details hereunder.

The ingredients of the composition of said improver additive according to the invention are the following:

| α/α | Ingredient | Permissible amount | Suggested amount |
|---|---|---|---|
| 1 | Diethyl ether $CH_3CH_2OCH_2CH_3$ Or another low molecular weight ether | 1-2% (by volume) | 1% |
| 2 | Acetone $CH_3COCH$ or another low molecular weight ketone as methyl ethyl ketone | 15-25% | 20% |
| 3 | Toluene $CH_3C_5H_6$ | 5-15% | 10% |
| 4 | Hexane $C_6H_{14}$ or another low molecular weight saturated hydrocarbon | 15-25% | 20% |
| 5 | Turpentine (oil) | 15-25% | 20% |
| 6 | Methyl alcohol $CH_3OH$ or another low molecular weight alcohol | 15-25% | 20% |
| 7 | Ethyl alcohol $CH_3CH_2OH$ or another low molecular weight alcohol as isopropylic | 5-10% | 9% |

The included ingredients referred to above by the numerals 1 to 7 are proposed as strong solvents for organic and inorganic substances, having a low Flash point. They don't react with the metals of the engine and they are not corrosive. The included ingredients 1 to 5 are perfect solvents for triglycerides with high percentage of saturated fatty acids and high "melting point" close to 0° C. they are responsible for filter plugging of the fuel at low temperature, i.e. below 0° C. In this case, because of the fact that there is no way to completely eliminate triglycerides with high melting point up to 100% with the method of "cooling", "crystallization", "filtration" the application of the above remarkably proposed additive composition is very useful since it results in the improvement of the CFPP index (Cold Filter Plugging Point).

Said solvents with low molecular weight and low flash point improve the ignition of the fuel in the engine at temperatures lower than 0° C. The flash point of cottonseed oil is 234° C. compared to the diesel flash point 67.7 and affects the ignition.

The combination of a correct combustion and solvent ability result in a clean engine from unburning residues or deposits. The molecules of the ingredients of said additive composition are burning with priority and help the better combustion of the molecules of the main fuel. The ingredients referred to above 6 and 7, as described above, are strong perfectly solvents enchaining small amounts of water, thereby avoiding the situation where traces of water affect filter plugging at low temperature and engine wear.

It is well-known that there are deposits of incorrect combustion in engines such as carbon, gums, resins, varnishes and other. All the ingredients of the proposed additive are strong solvents of organic and inorganic compounds. Specifically, the existence of turpentine oil in the composition of said additive solves these substances and conduces the avoiding of deposits with an effective manner. By this way, the "additive" eliminates the disadvantages of vegetable oils. This additive is not toxic and its use complies with the legislation (European standard EN 14214/2003, page 6, Additives).

Cottonseed oil has the lowest Iodine Index in comparison with other vegetable oils and the lowest polymerization tendency. Consequently, according to the above mentioned privileged main embodiment, mixtures of diesel-cottonseed oil according to the above mentioned method with said additive were experimented with the following results:

- Increase of Cetane Number from 52.5 up to 55.2 thereof and no reduction
- Compatibility of the mixtures with diesel-oil with the technical specifications of EN14214/2003 for Biodiesel and EN 590/1999 for diesel fuel.
- Equal energy content of 1 liter of cottonseed oil with 1 liter of diesel fuel.
- Exhaust gas emissions complying with the corresponding emission standards.
- Easy mixing of diesel fuel and cottonseed oil. The mixture is stable and cannot be separated by mechanical methods.
- No wear of engine metal parts since its constituents do not react with metals.
- No effect on power and elasticity of the engine compared to pure diesel fuel.
- Reduced fuel consumption, due to the improved combustion properties like the higher Cetane Number available.
- Maintenance of the engine at clean state, without unburnt residues and with reduced friction wear.

The above-mentioned results and also relative measurements are given hereafter in more details after an experimentation on the direct application of cottonseed oil-diesel blends refined as fuel for diesel engine vehicle according to the invention without using additional retrofit mechanical systems, as shown in the tables 1 to 4 and the FIGS. 1 to 12. More specifically, said tables presents measurements of important fuel properties, density, viscosity, cetane number and cold flow characteristics. Thus, a common rail Euro 3 compliant diesel car is tested using 10% v/v cottonseed oil-diesel blends refined with the method according to the above-mentioned privileged main embodiment of this invention. The results of said experimentation of the vehicle measurements are shown in the FIGS. 1 to 12. The approach adopted in said experimentation for the evaluation of cottonseed oil-diesel fuel blends was based mainly on the current EU legislation. According to Directive 2003/30/EC "pure vegetable oils produced from oil plants through pressing, extraction or comparable procedures, crude or refined but chemically unmodified are recognised as biofuels—plain or blended with diesel—when compatible with the type of engines involved and the corresponding emission requirements". With regard to the legislative provisions the measurements conducted had two distinct targets:

- Examine if and at what proportion cottonseed oil-diesel blends comply with the existing diesel fuel quality standards (Diesel engine compatibility)
- Run vehicle exhaust emission tests (Emission standard requirements).

A preliminary set of measurements of some key fuel properties (density, viscosity, cetane number) was conducted for blends of various oil concentrations in order to limit the number of possible fuel-oil concentrations that fulfil the basic fuel standard requirements. The test said fuels were then applied on a VW Golf 1.9 TDi passenger car Euro 2 compliant for a mileage of 20.000 km in order to test the effectiveness and applicability of the test fuels. Regular measurements of the vehicle emissions and performance where conducted in the laboratory during this phase. The ratio of the average value measured using the test fuels over the average baseline measurement values for each driving cycle and pollutant is presented in Table 1 as follows.

TABLE 1

Average value of the test fuel measurements over baseline measurements average value for each driving cycle-pollutant for the VW Golf

| Emission | Cottonseed oil concentration in fuel v/v | UDC cold | EUDC | NEDC | Artem Urban | Artem Road | Artem Mtw |
|---|---|---|---|---|---|---|---|
| $CO_2$ | 10% | 0.98 | 0.90 | 0.94 | 0.94 | 0.93 | 0.95 |
|  | 20% | 1.05 | 0.97 | 1.01 | 0.97 | 0.97 | 0.97 |
| FC | 10% | 0.98 | 0.90 | 0.93 | 0.93 | 0.92 | 0.94 |
|  | 20% | 1.03 | 0.95 | 0.99 | 0.95 | 0.96 | 0.95 |
| CO | 10% | 1.19 | 1.62 | 1.26 | 1.15 | 0.95 | 0.95 |
|  | 20% | 1.35 | 1.52 | 1.38 | 1.06 | 0.86 | 0.88 |
| HC | 10% | 1.14 | 1.27 | 1.17 | 1.21 | 1.04 | 0.95 |
|  | 20% | 1.47 | 1.41 | 1.45 | 1.14 | 1.01 | 0.95 |
| $NOx$ | 10% | 0.97 | 0.89 | 0.93 | 0.91 | 0.88 | 0.85 |
|  | 20% | 1.07 | 1.10 | 1.09 | 1.04 | 1.06 | 1.05 |
| PM | 10% | 1.34 | 1.07 | 1.17 | 1.05 | 1.19 | 1.00 |
|  | 20% | 1.68 | 1.14 | 1.34 | 0.96 | 1.00 | 0.87 |

Results showed that the presence of said cottonseed oil did not significantly affect the vehicle emission and consumption levels. After 20.000 km no problems appeared due to the use of the test fuels. Furthermore, It was concluded that the concentration of cottonseed oil that complied even better with existing legislation and presented even better operational characteristics was 10% v/v. In view of the findings of the initial test phase new measurements were conducted focusing on the standardised properties set for diesel fuel in Europe and some additional non legislated cold flow characteristics. Moreover extensive application and detailed laboratory measurements were decided for evaluating the compatibility of said test fuel with modern common rail technology vehicles.

The fuel properties investigated were density, viscosity at 40° C., higher heating value, cetane number, cetane index, cold filter plugging point, cloud point, pour point, flash point and copper strip corrosion test. The experimented fuels were cottonseed oil-diesel fuel blends according to the method of this invention, of low oil concentration (10 and 20% v/v) and standard diesel fuel for reference, in order to obtain a picture of the quality of the cottonseed oil used and refined according to the method of the invention as mentioned-above. The results of the measurements are presented in Table 2 as follows.

bustion quality should be similar to that of plain diesel. Furthermore, all cold flow properties of said test fuel as mentioned above were found close to those of standard diesel. Furthermore, the use of the additive as described above according to the invention improves the CFPP.

Following the fuel properties measurements, cottonseed oil-diesel blends of 10% v/v oil concentration refined with the method according to the main embodiment of this invention were applied on a Euro 3 compliant Renault Laguna 1.9 dCi Common Rail passenger car. The main target was to investigate whether the vehicle remained within its Euro 3 emissions specification when the test fuel is used. It was important to examine the operation of the vehicle not only under type approval but also under real world driving conditions as well. This approach offers a more complete picture of vehicle operation and can support a thorough analysis. For these reasons the Artemis driving cycles were used in combination with the standard European type approval procedure. The Artemis driving cycles were developed in the framework of the project ARTEMIS (Assessment and Reliability of Transport Emission Models and Inventory Systems) a scientific programme funded by the European Commission, which aimed at the development of a harmonised emission model.

TABLE 2

Fuel properties measurements and the respective fuel standards

| Property | Diesel | Cottonseed Oil 10% | Cottonseed Oil 20% | Cottonseed Oil 100% | EN590 | EN14214 | Test Method Applied |
|---|---|---|---|---|---|---|---|
| Density @ 20° C. (g/l) | 832 | 841 | 850 | 920 | 820-845 | 860-900 | ASTM 287 |
| Viscosity @ 40° C. (cSt) | 2.72 | 3 | 3.79 | 32.75 | 2.0-4.6 | 3.5-5 | ASTM D445 |
| Higher Heating Value (kJ/kg) | 44963 | 44475 | 43988 | 40086 | — | — | CEN/TS 14918:2005 |
| Cetane Number | 52.5 | 54 | 55 | 41.2 | 51 (min) | 51 (min) | DIN 51773 |
| Cetane Index (mg/kg) | 55.1 | 53.27 | 51.87 | — | 46 (min) | — | ASTM D976 |
| CFPP (° C.) | −10 | −6 | −6 | — | −5 (max Greece) | −5 | IP 309 |
| Cloud Point (° C.) | 1 | 1.7 | 1.4 | — | — | — | ASTM D2500 |
| Pour Point (° C.) | −16 | −17 | −14 | — | — | — | ASTM D97 |
| Flash Point (° C.) | 67.7 | 68.4 | 70.7 | — | 55 (min) | 120 (min) | ASTM D93 |
| Copper Strip Corrosion | 1A | 1A | 1A | — | Class 1 | Class 1 | ASTM D130 |

Fuel properties measurements presented in said table 2, clearly show that a 10% v/v cottonseed oil-diesel fuel is in line with all EN590 specifications. From said table it is clear also that the presence of cottonseed oil refined according to the invention increases flash point. In addition the fact that vegetable oil molecules include oxygen may result in different characteristics. Cetane number, which is generally used as an indicator of combustion quality of the fuel, appears remarkably improved in the blends a fact that was not expected as vegetable oils tend to have low cetane numbers. The conclusion is that the test fuels' cetane number remains within the standardised limits for diesel fuel and thus com- The Artemis cycles (Andre 2004) are distinguished into 3 different sub-cycles that simulate different on road operating conditions: Artemis urban cycle (URBAN) for urban driving conditions, a semi-urban cycle (ROAD) simulating the operation of the vehicle in a regular medium speed road, and the extra urban cycle (MOTORWAY) replicating the operation in high speed freeway. The speed versus time profile of the aforementioned cycles is presented in FIG. 1. The protocol adopted for the measurements included one cold New European Driving Cycle—NEDC (the combined legislated driving cycle), one hot Urban Driving Cycle—UDC (urban sub-cycle of NEDC) and then the Artemis driving cycles. The timeline and the protocols followed for each measurement are presented in Table 3 as follows.

TABLE 3

Measurements History and Protocols Followed

| Measurement | Relative Mileage (km) | Measurements Conducted |
|---|---|---|
| Baseline (Diesel 50 ppm S) | 0 (56000 km real vehicle mileage) | 2 × NEDC + 1 × Artemis + Acceleration Tests |
| Cottonseed oil 10% v/v 1# (90% Diesel 50 ppm S) | 2000 | 2 × (NEDC + Artemis) + Acceleration Tests |
| Cottonseed oil 10% v/v 2# (90% Diesel 50 ppm S) | 6000 | 2 × NEDC |
| Cottonseed oil 10% v/v 3# (90% Diesel 50 ppm S) | 12000 | 2 × (NEDC + Artemis) + Acceleration Tests |
| Baseline #2 (Diesel 50 ppm S) | 14000 | 2 × (NEDC + Artemis) + Acceleration Tests |

Considering the vehicle mileage at the baseline as zero, a first thorough measurement was conducted after 2000 km of biofuel application, which included 2 repetitions of the Artemis protocol. In order to check the condition of the vehicle a second set of measurements was conducted following the type approval protocol after 6000 km of biofuel use. An additional set of measurements under the Artemis protocol was conducted after 12000 km in order to examine the effect of the long term cottonseed oil use. Finally a second baseline measurement was conducted after 14000 km for bracketing. In all cases for the emissions measurement, legislated constant volume sampling (CVS) was applied. The results of the measurements are summarised as shown in FIGS. 2-7.

Figure 8:
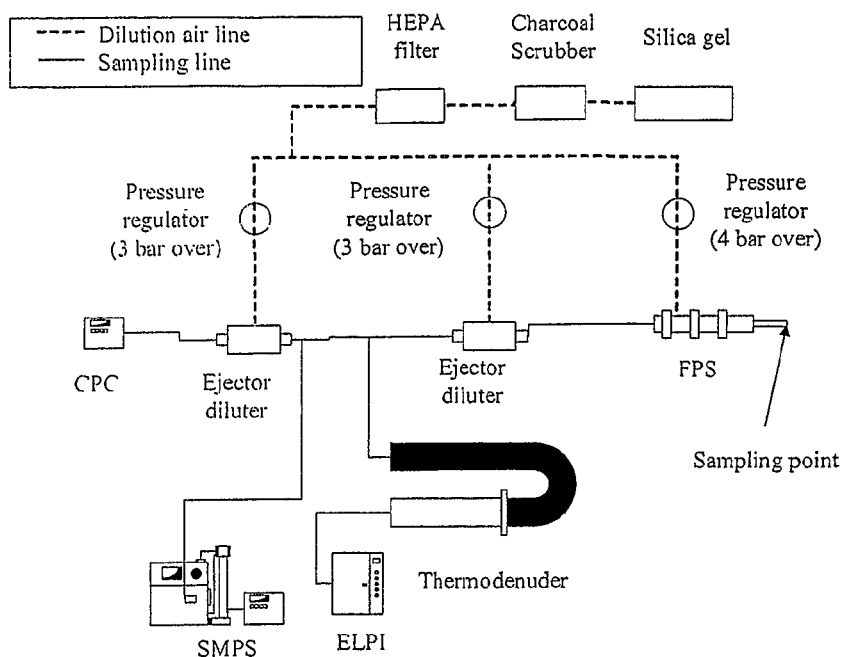

As regards particle emissions, measurements were also extended to non legislated particle properties such as number concentration and size distribution. FIG. 8 shows the setup employed for these measurements. Samples were taken from the CVS with a Dekati Fine Sampler (FPS-4000) operating at a nominal dilution ratio of 12:1. Additionally, two calibrated ejector-type dilutors (Giechaskiel et al 2004) were employed in order to bring particle emissions levels within the measuring range of the instruments. A Condensation Particle Counter (TSI's 3010 CPC) was used to monitor the total particle number concentration. A Dekati's Electrical Low Pressure Impactor (ELPI), sampling downstream of a Dekati's Thermodenuder, provided the aerodynamic size distribution of "dry" particles in real time. The ELPI operated with wet (oil-soaked) sintered plates and a filter stage that extended the lower cutpoint to ~7 nm. Over steady-state tests (50-90-120 km/h), a scanning mobility particle sizer (Model 3936L10 SMPS) was used instead of the CPC, monitoring the number weighted mobility size distribution. The SMPS operated on a sheath over sample flow ratio of 10:1 lpm and the scan time was 90 sec. In accordance with the gravimetric results, the number emission rates have been expressed per kilometer driven. It should be noticed that the ELPI data reduction requires the knowledge of the effective particle density. As this information is not available, a unit effective density was assumed (a common assumption in studies where an ELPI is employed). Moreover the ELPI results have been corrected for diffusion and space charge losses as well as thermophoretic losses inside the thermodenuder. The results of the non regulated particle measurements are presented in FIGS. 9-11.

Finally in order to quantify the effects of the test fuel on vehicle performance acceleration tests were performed. During each of these tests the vehicle was accelerated on the chassis dynamometer under full throttle and using the 4th gear. The time for accelerating from 60 to 110 km/h was recorded. A set of 5 accelerations was conducted for each measurement. The results are summarised in FIG. 12.

Regarding $CO_2$ emissions and fuel consumption several variations are observed as shown in the FIGS. 2 and 3 when using cottonseed oil-diesel blends refined with the method according to the invention. Most of these variations lay within the accepted ±5% uncertainty which is foreseen by legislation for such measurements. Thus any apparent increase in $CO_2$ emissions time cannot be confirmed. Finally, since the average value of the measurements falls very close to the baseline it can be concluded that the overall energy performance and $CO_2$ emissions of the vehicle are not affected by cottonseed oil. Regarding regulated gaseous pollutants the situation is similar to that of $CO_2$. In all cases emissions remain below the Euro 3 emission standard limits for the legislated test cycle (NEDC) as it is also presented in Table 4.

TABLE 4

Euro III emission limits and legislated emissions measurements results

| Pollutant | Euro III Limits | Baseline | Cottonseed oil Measurement #1 | Cottonseed oil Measurement #2 | Cottonseed oil Measurement #3 | Baseline #2 |
|---|---|---|---|---|---|---|
| CO | 0.64 | 0.39 | 0.50 | 0.27 | 0.25 | 0.23 |
| NOx | 0.50 | 0.40 | 0.35 | 0.44 | 0.40 | 0.41 |
| PM | 0.05 | 0.03 | 0.03 | 0.03 | 0.04 | 0.04 |
| HC + NOx | 0.56 | 0.44 | 0.39 | 0.47 | 0.42 | 0.43 |

For CO, HC and NOx the emission levels are close to those of the baseline. For PM the presence of this vegetable oil appears to increase the scatter of the measurements but not the average value. It is important to note that the emissions of the vehicle under real world conditions remain also unaffected by the fuel.

Figure 9A:
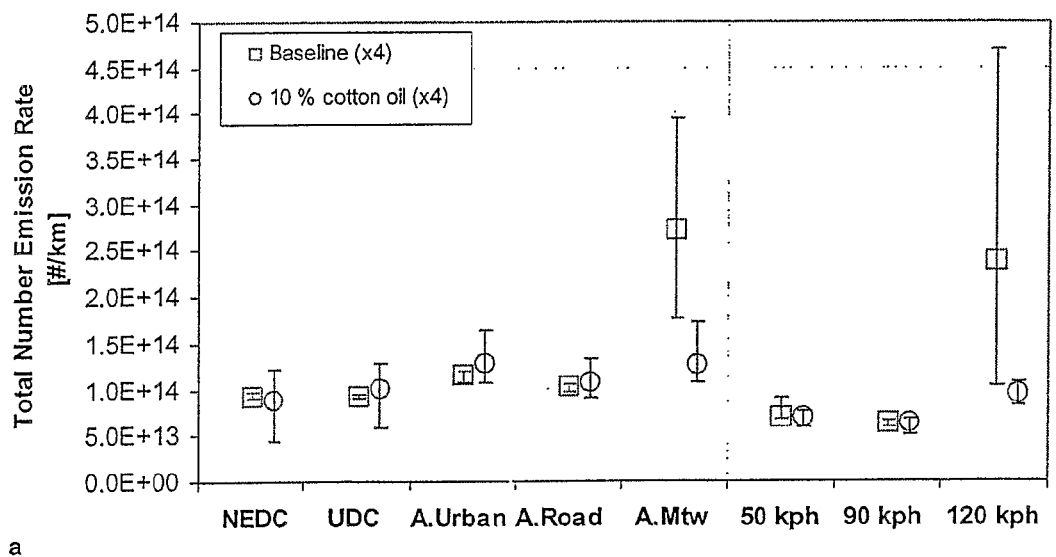

Concerning the non regulated particle emissions, the total particle number population for each fuel-cycle combination is shown in FIG. 9a. Within the experimental uncertainty, excluding the Artemis Motorway cycle and the steady-state test at 120 km/h, the use of said 10% v/v cotton oil, does not seem to change the total number of particles emitted. Under high load conditions though, addition of 10% v/v oil, results in significantly lower emissions. The reduction is in the range of ~55%. Said oil as described above according to the invention seems to prevent the formation of nanoparticles, which are usually generated under motorway driving conditions. FIG. 9b shows the solid particle number emissions for all test cycles of this experimentation and fuels employed. The addition of 10% v/v cotton oil doesn't affect the solid particle number emission rate.

A nearly lognormal distribution was obtained under 50 kph and 90 kph steady state cruising. As an example, FIG. 10 shows the number weighted size distributions at 90 kph. The presence of 10% v/v cotton oil refined according to the method as described above of this invention, does not affect the shape of the distribution. The geometric mean diameter for the tests with oil agreed within ±1 nm to those determined when diesel fuel was used.

FIG. 11 shows the number weighted size distributions at 120 kph steady state speed. Doping the fuel with 10% v/v cotton oil seems to lead in total suppression of the nucleation mode. This is consistent with the significant reduction (~55%) of the total particle number emissions, which is observed under motorway driving conditions. The geometric mean diameter of the accumulation mode of all distributions is not affected.

The experience gained from the above-mentioned experimentation indicates that a 10% v/v cottonseed oil diesel blend refined with the method according to the invention does neither affect the performance of the vehicle nor the gaseous emissions.

According to the invention, a new solution is proposed, which was considered unattainable so far and by means whereof a substitute of diesel fuel of low cost is achieved. Cottonseed oil, in particular, similarly to other vegetable oils, is produced in many countries in large quantities because of cotton cultivation. The exploitation of its energy content at an attractive price difference from diesel fuel can substantially enhance the arguments of the farmers, in particular as regards the requested subsidies and the possible quotas regarding cotton cultivation area. This is valid for countries that cultivate cotton but also for other plantations with oliferous seeds that are able to give usable oils with the described method.

The combination of use safety as a result of the avoidance of acids, the produced fuel quality, environmental impacts and price is unique. It may affect positively the inflation rates, reducing costs of transportation and the imports of fossil fuels or biofuels that may be offered from low cost countries.

This new method for vegetable oil exploitation without the increased cost of chemical transformation of oils into fatty acids methyl esters has the ability of direct and simple industrial application at the already existing oil mills. The marketing and availability of the product is more than secure because of the attractive price difference from diesel fuel and biodiesel.

The invention claimed is:

1. A method comprising refining vegetable oils, cottonseed oil or a mixture of cottonseed oil with other vegetable oils, for the purpose of producing a biofuel, wherein a sequence of treatment steps are performed on crude vegetable oil, including:
   a) a pre-treatment thereof comprising removal of oil insoluble impurities from the crude oil,
   b) removal of oil soluble impurities therefrom, c) a free acid neutralization thereof, and d) a drying, bleaching and filtration thereof,
   wherein an additive is added and wherein ingredients of the composition of said additive is diethyl ether $CH_3CH_2OCH_2CH_3$ acetone $CH_3COCH_3$ toluene $CH_3C_5H_6$, hexane $C_6H_{14}$ turpentine, methyl alcohol $CH_3OH$ $CH_3CH_2OH$.

2. Method according to claim 1, wherein said steps are performed in the sequence of first removing said oil insoluble impurities from the crude oil, subsequently removing said oil soluble impurities therefrom, subsequently neutralizing the oil by de-acidification, and afterwards drying, bleaching and filtration thereof.

3. Method according to claim 2, wherein said steps are followed by a de-stearinization of said oil.

4. Method according to claim 3, wherein said steps are followed by a deodorization of said oil.

5. Method according to claim 1, wherein said pre-treatment step of removal of the oil insoluble impurities comprises a combination of settling and filtration or centrifugation of the crude oil.

6. Method according to claim 1, wherein said step of removal of oil soluble impurities comprises eliminating free fatty acids and substances foreign to the glycerides of pure oil contained in the oil, and/or of eliminating impurities in true solution or in a state of colloidal suspension.

7. Method according to claim 1, wherein said step of removal of oil soluble impurities removal is combined with said neutralization step, and said neutralization step further comprises neutralization of said free fatty acids with caustic soda, resulting in formation of soap by said neutralization of said free fatty acids, whereby a proportion of the impurities is removed.

8. Method according to claim 7, wherein said neutralization step includes addition of a dense caustic soda solution, of approximately 20° Be, in excess of 60-80%, thereby additionally resulting in both a purification of the oil, as well as in an at least partial bleaching or decolorization thereof, thus facilitating the above-mentioned subsequent bleaching, and/or wherein said excess of caustic soda is applied in such a way that an over saponification takes place, thereby resulting in the formation of soap, and/or wherein said created soap is removed by settling or centrifugation, after which some weak caustic soda, in particular 6-8° Be, is added to clear out the particles of suspended soap and remove at least a part of the remaining coloring matters.

9. Method according to claim 8, wherein a hot water washing step is performed, at a temperature of at least 95° C. to 98° C., and/or wherein said hot water washing step is performed repeatedly, so as to at least substantially eliminate traces of caustic soda, soap and different particles, thereby reducing acidity of the oil to at least less than 0.05%.

10. Method according to claim 1, wherein said drying step is performed at an elevated temperature of at least 80° C. to 90° C. in closed vessels and under vacuum, of about 30 mmHg.

11. Method according to claim 1, wherein said bleaching step is performed by selecting a material with active surface, mixing said material with the oil and subsequently filtering the mixture thus achieved to remove different particles and coloring matters, and/or wherein said selection is among materials comprising bleaching earths or active carbon, wherein said material is mixed with said oil under said vacuum, wherein said mixture is subsequently filtered after a period of time of less than about 30 minutes, wherein said active surface materials are selected to retain the coloring substances by adsorption, thereby resulting in decoloration by adsorption, in which selected materials have a capacity to adsorb on their surfaces not only the coloring components but also other suspended substances that may affect correct diesel engine operation.

12. Method according to claim 3, wherein said de-stearinization step is performed by filtration, in order to achieve a necessary CFPP (Cold Filter Plugging Point) of the cottonseed oil and its mixtures with Diesel fuel at low temperatures below 3° C. to 0° C., wherein said de-stearinization step includes removal of the undesired constituents from the oil, wherein the oil is cooled for a prolonged period at temperatures some degrees below that at which the oil is required to remain clear and then filtered, wherein said cooling is performed sufficiently slowly to enable the components with higher melting point to form well built crystals, wherein said cooling and filtration are carried out in a well insulated room equipped with refrigeration, and wherein said de-stearinization step is performed by successively
- a) Pre-cooling the oil at T1 with agitation during t1
- b) Cooling and crystallization at T2 without agitation during t2
- c) Cooling and crystallization at T3 without agitation during t3
- d) Filtration during t4 where T1, T2, T3 are the temperatures and t1, t2, t3, t4 the time intervals for the intermediate stages, which may vary according to the season and the low temperatures of a given region, resulting in the oil achieved with this procedure, wherein addition of a proper additive does not affect the CFPP value of Diesel fuel, preferably wherein the parameter values T1 is about 5° C. and t1 is about 5 hours correspondingly, where T2 is about 0° C. and t2 is 12 hours correspondingly, where T3 is about -7° C. and t3 is about 24 hours correspondingly and where t4 is about 8 hours.

13. Method according to claim 4, wherein said deodorization step is performed in order to remove undesirable substances of the oil by passing a current of dry steam through the oil at high temperatures under vacuum, resulting in the selective removal of the undesirable odoriferous compounds and substances, and/or wherein said de-deodorization step is performed by passing a current of dry steam through the oil at temperatures of the order of 200 to 225° C. under vacuum of the order of 6 to 30 mmHg, and wherein the removed components belong to either of the following groups:

Substances which are present in the crude oil and are responsible for the characteristic odor, Substances arising from deterioration of oil quality during storage or processing.

14. Refined oil produced by a method according to claim 1.

15. Refined oil produced by a method according to claim 1, in particular wherein said additive is added in the amount of 400-800 p.p.m in mixture of at least 10% cottonseed oil and maximum 90% diesel fuel.

16. Biofuel made of a blend of diesel fuel and a refined oil according to claim 14.

17. An additive of organic basis, wherein it contains ether, ketone, toluene, hexane, turpentine, and alcohols, for the purpose of operating a method comprising refining vegetable oils, cottonseed oil or a mixture of cottonseed oil with other vegetable oils, for the purpose of producing a biofuel, wherein a sequence of treatment steps are performed on crude vegetable oil, including:
- a) a pre-treatment thereof comprising removal of oil insoluble impurities from the crude oil,
- b) removal of oil soluble impurities therefrom, c) a free acid neutralization thereof, and d) a drying, bleaching and filtration thereof.

18. Additive according to claim 17, wherein the ingredients of the composition of said additive is diethyl ether $CH_3CH_2OCH_2CH_3$ acetone $CH_3COCH$, toluene $CH_3C_5H_6$, hexane $C_6H_{14}$, turpentine, methyl alcohol CHOH and ethyl alcohol $CH_3CH_2OH$.

19. Additive according to claim 18, wherein the percentage of diethyl ether $CH_3CH_2OCH_2CH_3$ is 1-2% v/v, the percentage of acetone $CH_3COCH$ is 15-25% v/v, the percentage of toluene $CH_3C_5H_6$ is 5-15% v/v, the percentage of hexane $C_6H_{14}$ is 15-25% v/v, the percentage of turpentine is 15-25% v/v, the percentage of the methyl alcohol $CH_3OH$ or 15-25% v/v, and the percentage of ethyl alcohol $CH_3CH_2OH$ is 5-10% v/v.

* * * * *